(12) United States Patent
Ma

(10) Patent No.: US 8,952,662 B2
(45) Date of Patent: Feb. 10, 2015

(54) CIRCUIT AND SYSTEM AND METHOD FOR CONTROLLING BATTERY

(75) Inventor: Chun-Chen Ma, New Taipei (TW)

(73) Assignee: Via Technologies, Inc., New Taipei (TW)

( * ) Notice: Subject to any disclaimer, the term of this patent is extended or adjusted under 35 U.S.C. 154(b) by 455 days.

(21) Appl. No.: 13/351,130

(22) Filed: Jan. 16, 2012

(65) Prior Publication Data

US 2013/0119938 A1    May 16, 2013

(30) Foreign Application Priority Data

Nov. 16, 2011   (TW) .............................. 100141750 A

(51) Int. Cl.
*H02J 7/00*   (2006.01)

(52) U.S. Cl.
CPC ............. *H02J 7/0016* (2013.01); *H02J 7/0021* (2013.01)
USPC .......................................... 320/134; 320/116

(58) Field of Classification Search
CPC .............................. H02J 7/0014; H02J 7/0016
USPC .................... 320/134, 116, 118, 119
See application file for complete search history.

(56) References Cited

U.S. PATENT DOCUMENTS

| | | | |
|---|---|---|---|
| 3,818,471 A | | 6/1974 | Kurschner |
| 3,942,104 A | | 3/1976 | Byrne |
| 4,661,310 A | * | 4/1987 | Cook et al. ..................... 376/259 |
| 5,159,260 A | | 10/1992 | Yoh et al. |
| 5,631,534 A | * | 5/1997 | Lewis ........................... 320/103 |
| 5,818,201 A | * | 10/1998 | Stockstad et al. .............. 320/119 |
| 5,907,238 A | | 5/1999 | Owerko et al. |
| 6,841,971 B1 | * | 1/2005 | Spee et al. ..................... 320/119 |
| 7,208,894 B1 | * | 4/2007 | Earle ............................. 318/105 |
| 7,408,325 B2 | * | 8/2008 | Yamamoto et al. ............ 320/133 |
| 7,598,706 B2 | * | 10/2009 | Koski et al. ................... 320/117 |
| 7,723,955 B2 | | 5/2010 | Zaag et al. |
| 8,288,992 B2 | * | 10/2012 | Kramer et al. ................ 320/119 |
| 2006/0046104 A1 | | 3/2006 | Zimmerman |
| 2008/0180061 A1 | * | 7/2008 | Koski et al. ................... 320/117 |

(Continued)

FOREIGN PATENT DOCUMENTS

| | | |
|---|---|---|
| CN | 1409455 | 4/2003 |
| CN | 101949966 | 1/2011 |
| CN | 201868903 | 6/2011 |

OTHER PUBLICATIONS

"One Button Turns Microprocessor On and Off;" Dallas Semiconductor; Jul. 19, 2004; pp. 1-3.

(Continued)

*Primary Examiner* — M'Baye Diao
(74) *Attorney, Agent, or Firm* — McClure, Qualey & Rodack, LLP

(57) ABSTRACT

A battery control circuit for balancing a battery includes a voltage detector, a controller, a balancing device, and a switch. The voltage detector is configured to detect a voltage difference of the battery so as to generate a detecting signal. The controller is configured to generate a control signal according to the detecting signal. The switch is coupled between the battery and the balancing device, and is opened or closed according to the control signal, wherein if the voltage difference is greater than a threshold value, the switch is closed and the balancing device draws a load current from the battery, and if the voltage difference is smaller than or equal to the threshold value, the switch is opened and the balancing device is not capable of drawing any current.

15 Claims, 4 Drawing Sheets

(56) References Cited

U.S. PATENT DOCUMENTS

| | | |
|---|---|---|
| 2008/0284383 A1 | 11/2008 | Aas et al. |
| 2009/0315515 A1* | 12/2009 | Yu et al. ............ 320/116 |
| 2010/0194339 A1* | 8/2010 | Yang et al. ............ 320/116 |
| 2011/0089898 A1* | 4/2011 | Lee et al. ............ 320/116 |
| 2012/0074898 A1* | 3/2012 | Schwartz ............ 320/107 |
| 2012/0086400 A1* | 4/2012 | White et al. ............ 320/118 |
| 2012/0161707 A1* | 6/2012 | Kim ............ 320/118 |
| 2012/0313439 A1* | 12/2012 | Yamaguchi et al. ............ 307/71 |

OTHER PUBLICATIONS

English language translation of abstract of CN 201868903 (published Jun. 15, 2011).

English language translation of abstract of CN 1409455 (published Apr. 9, 2003).

English language translation of abstract of CN 101949966 (published Jan. 19, 2011).

* cited by examiner

CIRCUIT AND SYSTEM AND METHOD FOR CONTROLLING BATTERY

CROSS REFERENCE TO RELATED APPLICATIONS

This Application claims priority of Taiwan Patent Application No. 100141750 filed on 16, Nov. 2011, the entirety of which is incorporated by reference herein.

BACKGROUND OF THE INVENTION

1. Field of the Invention

The disclosure generally relates to a battery control circuit, and more particularly, relates to a battery control circuit for balancing a battery.

2. Description of the Related Art

Traditionally, a battery management controller (BMC) is needed to be electrically coupled to a plurality of cells. The battery management controller increases whole space volume, and some number of pins are required to connect to cells. In addition, signal noise generated by the battery management controller causes charging processes to be unstable, and decreases the operation lifespan of the cells.

BRIEF SUMMARY OF THE INVENTION

In order to solve the foregoing problems, the invention provides a new battery control circuit for automatically detecting a voltage difference of at least one battery cell, automatically balancing the battery cell and reducing influence of noise.

In one exemplary embodiment, the disclosure is directed to a battery control circuit for balancing a battery. The battery control circuit comprises: a voltage detector, a controller, a balancing device, and a switch. The voltage detector is configured to detect a voltage difference of the battery so as to generate a detecting signal. The controller is configured to generate a control signal according to the detecting signal. The switch is coupled between the battery and the balancing device, and is opened or closed according to the control signal. If the voltage difference is greater than a threshold value, the switch is closed and the balancing device draws a load current from the battery, and if the voltage difference is smaller than or equal to the threshold value, the switch is opened and the balancing device is not capable of drawing any current.

In another exemplary embodiment, the disclosure is directed to a battery control system. The battery control system comprises: a battery, a voltage detector, a controller, a balancing device, and a switch. The battery has a voltage difference. The voltage detector is coupled to the battery, and configured to detect the voltage difference so as to generate a detecting signal. The controller is configured to generate a control signal according to the detecting signal. The switch is coupled between the battery and the balancing device, and is opened or closed according to the control signal. If the voltage difference is greater than a threshold value, the switch is closed and the balancing device draws a load current from the battery, and if the voltage difference is smaller than or equal to the threshold value, the switch is opened and the balancing device is not capable of drawing any current.

In one exemplary embodiment, the disclosure is directed to a battery control method for balancing a battery. The battery control method comprises the steps of: detecting a voltage difference of the battery so as to generate a detecting signal; generating a control signal according to the detecting signal; drawing a load current from the battery by a balancing device if the voltage difference is greater than a threshold value; and not drawing any current from the battery by the balancing device if the voltage difference is smaller than or equal to the threshold value.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
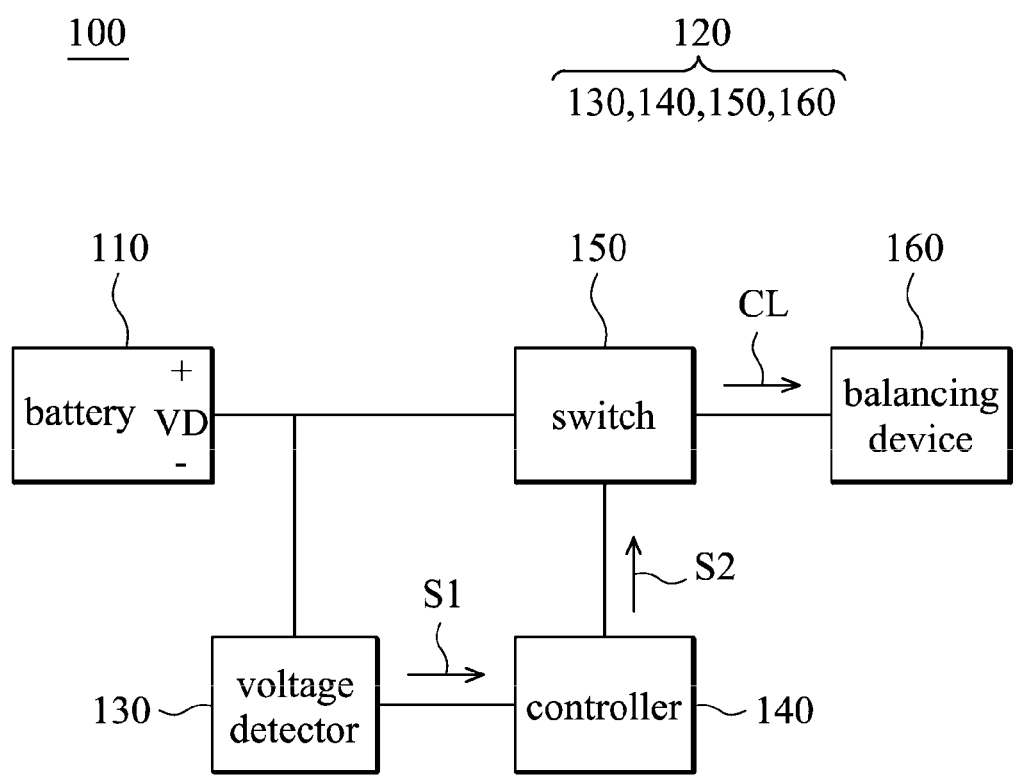
FIG. 1 is a diagram for illustrating a battery control system according to an embodiment of the invention.

FIG. 1 is a diagram for illustrating a battery control system 100 according to an embodiment of the invention. As shown in FIG. 1, the battery control system 100 comprises a battery 110 and a battery control circuit 120. The battery 110 may be a rechargeable battery, for example, a lithium battery, a lithium iron phosphate (LFP, $LiMPO_4$, where M may be metal elements such as Fe, Co, Mn, or Ti) battery, or a lead-acid battery. The battery control circuit 120 is configured to balance the battery 110. In one embodiment, "balance" means that: if the battery control circuit 120 detects that a voltage difference VD of the battery 110 is greater than a threshold value (e.g., 3.55V or 3.6V), the battery control circuit 120 will discharge the battery 110 so as to prevent damage to the battery 110.

The battery control circuit 120 comprises: a voltage detector 130, a controller 140, a switch 150, and a balancing device 160. The voltage detector 130 is configured to detect the voltage difference VD of the battery 110 so as to generate a detecting signal S1. The controller 140 is configured to generate a control signal S2 according to the detecting signal S1. The switch 150 is electrically coupled between the battery 110 and the balancing device 160, and is closed or opened according to the control signal S2. In a preferred embodiment of the invention, if the voltage detector 130 detects that the voltage difference VD is greater than a threshold value (e.g., 3.55V or 3.6V), the controller 140 will close the switch 150 such that the balancing device 160 draws a load current CL from the battery 110 and reduces the voltage difference VD of the battery 110. On the contrary, if the voltage detector 130 detects that the voltage difference VD is smaller than or equal to the threshold value, the controller 140 will open the switch 150 such that the balancing device 160 is incapable of drawing any current.

Figure 2:
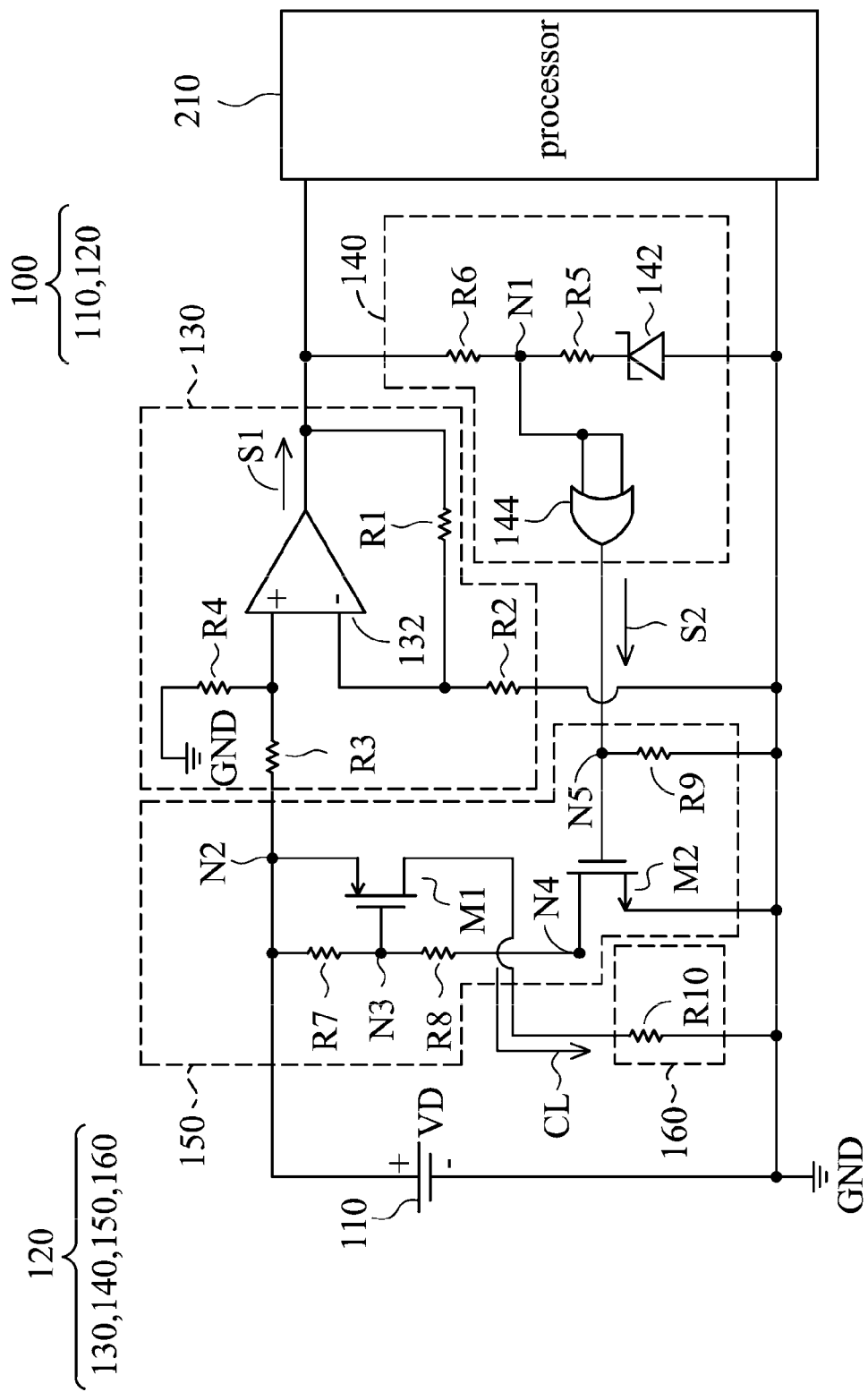
FIG. 2 is a diagram for illustrating the battery control system electrically coupled to a processor according to an embodiment of the invention.

FIG. 2 is a diagram for illustrating the battery control system 100 electrically coupled to a processor 210 according to an embodiment of the invention. As shown in FIG. 2, the battery control system 100 may be electrically coupled to the processor 210, which is configured to obtain the detecting signal S1 so as to obtain the voltage difference VD of the battery 110. The processor 210 may be implemented with a central processing unit (CPU) or a chip.

The voltage detector 130 comprises: an operational amplifier (OP) 132 and resistors R1, R2, R3 and R4. The operational amplifier 132 has a positive input end, a negative input end and an output end, wherein the output end is configured to output the detecting signal S1 to the controller 140. The resistor R1 is electrically coupled between the negative input end and the output end. The resistor R2 is electrically coupled between the negative input end and a ground voltage GND. The resistor R3 is electrically coupled between the positive input end and a node N2 of the switch 150, wherein the node N2 is also electrically coupled to the positive electrode of the battery 110. The resistor R4 is electrically coupled between the positive input end and the ground voltage GND.

The controller 140 comprises: a Zener diode 142, resistors R5 and R6, and an OR gate 144. The Zener diode 142 has a cathode and an anode electrically coupled to the ground voltage GND. The resistor R5 is electrically coupled between the cathode and a node N1. The resistor R6 is electrically coupled between the node N1 and the output end of the operational amplifier 132 of the voltage detector 130. The OR gate 144 has two input ends electrically coupled to the node N1, and an output end electrically coupled to a node N5 of the switch 150, wherein the output end is configured to output the control signal S2. It is noted that the OR gate 144 of the controller 140 is configured to reduce fluctuation of the control signal S2 so as to reduce the influence of noise on the battery control circuit 120. If the voltage difference VD is greater than a threshold value, the OR gate 144 will output the control signal S2, which is equal to a high logic level (e.g., logic 1), so as to close the switch 150; on the contrary, if the voltage difference VD is smaller than or equal to the threshold value, the OR gate 144 will output the control signal S2, which is equal to a low logic level (e.g., logic 0), so as to open the switch 150.

The switch 150 comprises: transistors M1 and M2, and resistors R7, R8 and R9. In a preferred embodiment of the invention, the transistor M1 is a PMOS transistor (P-channel Metal-Oxide-Semiconductor Field-Effect Transistor), and the transistor M2 is an NMOS transistor (N-channel Metal-Oxide-Semiconductor Field-Effect Transistor). The transistor M1 is electrically coupled between the node N2 and the balancing device 160, and has a gate electrically coupled to a node N3. The transistor M2 is electrically coupled between a node N4 and the ground voltage GND, and has a gate electrically coupled to the node N5. The resistor R7 is electrically coupled between the node N2 and the node N3. The resistor R8 is electrically coupled between the node N3 and the node N4. The resistor R9 is electrically coupled between the node N5 and the ground voltage GND. The node N2 is also electrically coupled to the battery 110 and to the voltage detector 130. The node N5 is also electrically coupled to the controller 140.

The balancing device 160 comprises a resistor R10, which is electrically coupled between the switch 150 and the ground voltage GND. If the switch 150 is closed, the balancing device 160 will draw the load current CL from the battery 110 so as to reduce the voltage difference VD. In a preferred embodiment, the resistor R10 has small resistance so as to draw the large load current CL. For example, the resistance is smaller than 100Ω.

Figure 3:
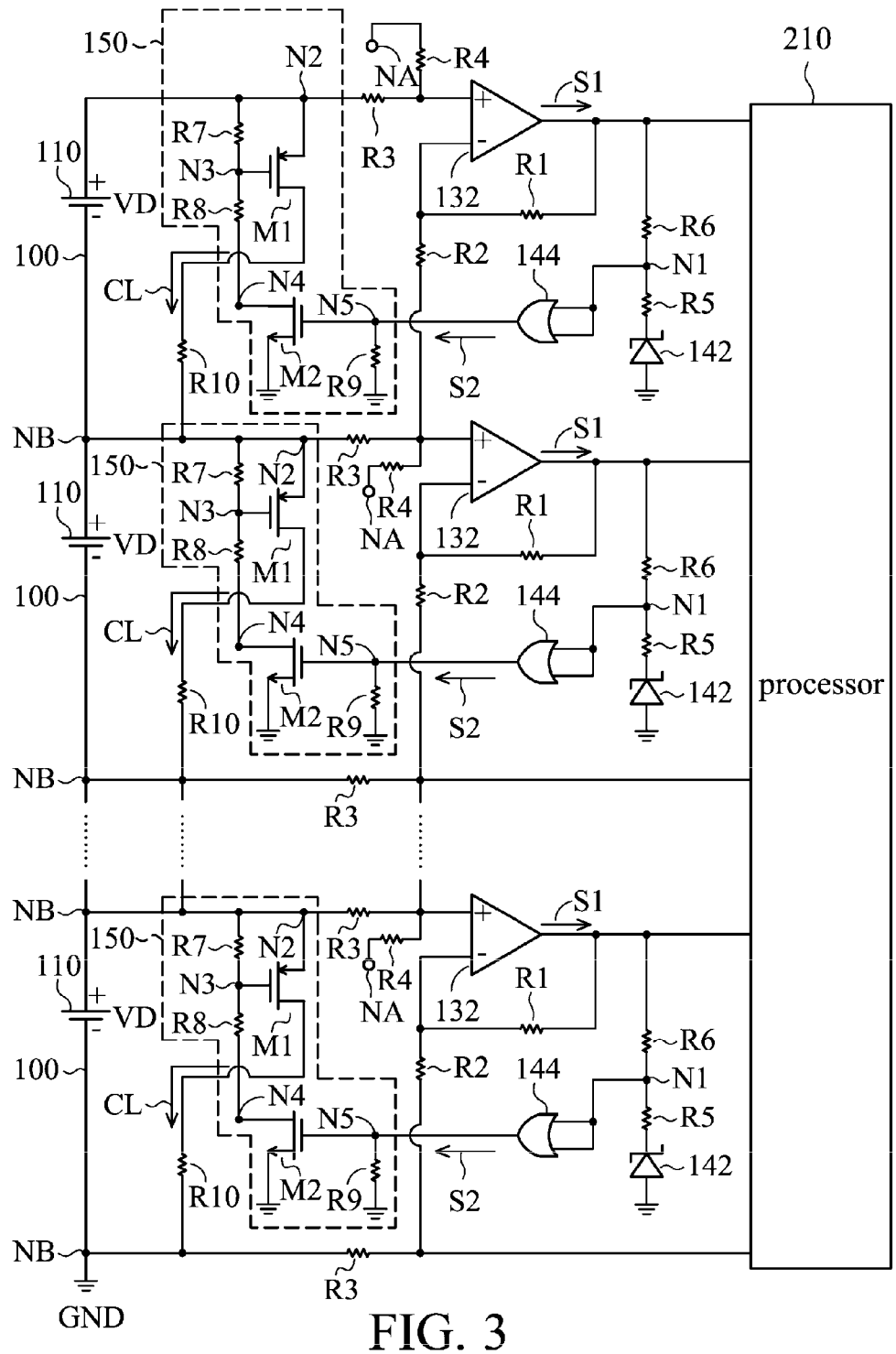
FIG. 3 is a diagram for illustrating a plurality of battery control systems electrically coupled to the processor according to an embodiment of the invention.

FIG. 3 is a diagram for illustrating a plurality of battery control systems 100 electrically coupled to the processor 210 according to an embodiment of the invention. As shown in FIG. 3, the plurality of battery control systems 100 is interconnected in series and each system 100 is electrically coupled to the processor 210. A node NA of each battery control system 100 is further directly electrically coupled to a node NB. Since there is a plurality of batteries 110, each switch 150 is required to tolerate a large voltage difference to prevent damage to the plurality of batteries 110. For example, if there are N battery control systems 100 disposed in series, each switch 150 is designed to tolerate the maximum voltage difference N*VD, wherein N is an integer greater than or equal to 2. In other words, each switch 150 is required to tolerate the sum of the voltage differences of all batteries.

Figure 4:
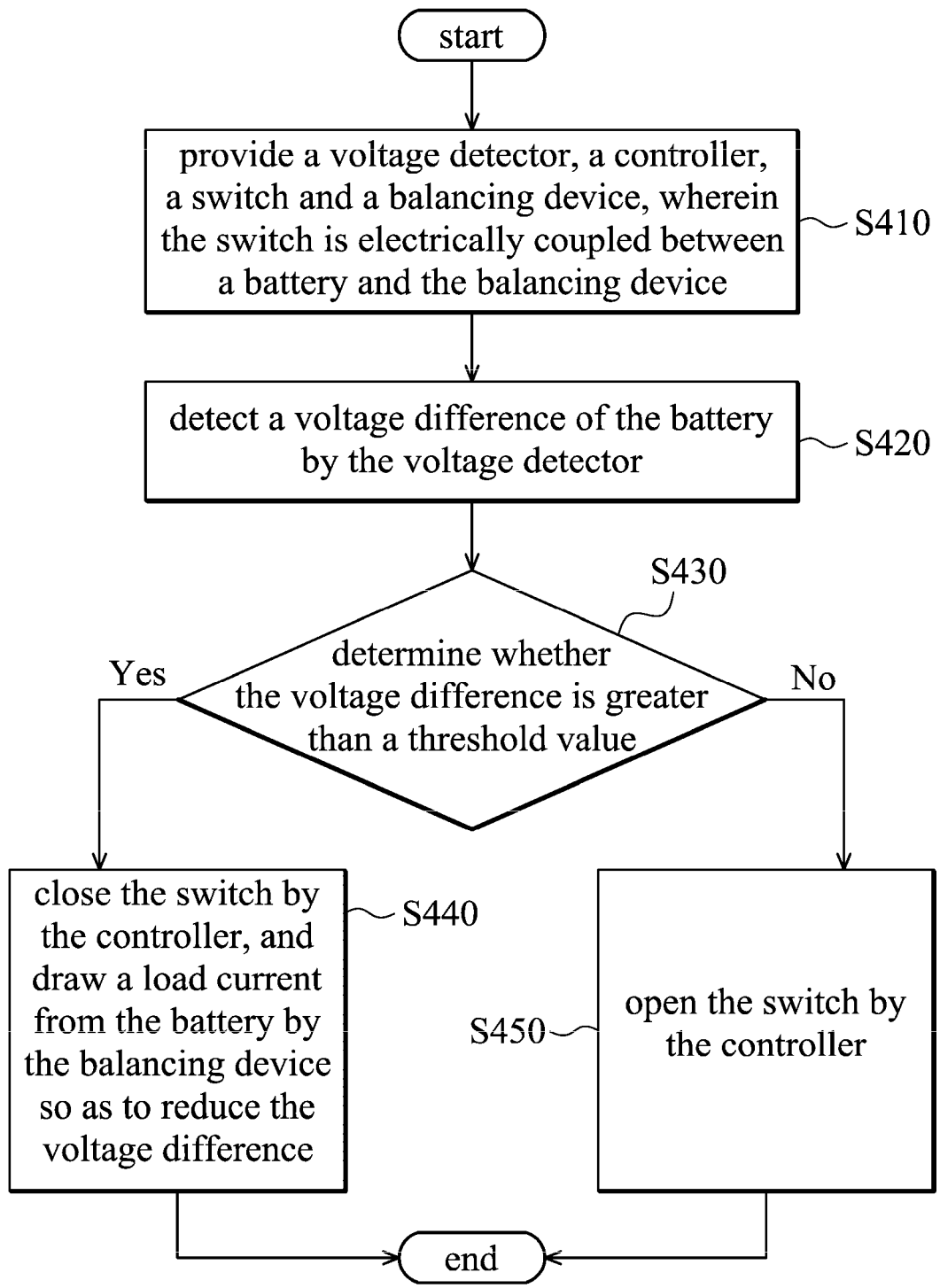
FIG. 4 is a flowchart for illustrating a battery control method for controlling a battery according to an embodiment of the invention.

FIG. 4 is a flowchart for illustrating a battery control method for controlling a battery according to an embodiment of the invention. To begin, in step S410, a voltage detector, a controller, a switch and a balancing device are provided, wherein the switch is electrically coupled between a battery and the balancing device. In step S420, a voltage difference of the battery is detected by the voltage detector so as to generate a detecting signal. In addition, a control signal is generated according to the detecting signal. In step S430, whether the voltage difference is greater than a threshold value is determined. If so, the flow goes to step S440, the switch is closed by the controller, and a load current is drawn from the battery by the balancing device; otherwise, the flow goes to step S450, the switch is opened by the controller.

The embodiments can automatically detect a voltage difference of a battery, balance the battery and reduce the influence of noise. In addition, the embodiments can also reduce the number of pins of the battery management controller, and can decrease the volume of the battery management controller. The load of the battery management controller can be effectively improved.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

It will be apparent to those skilled in the art that various modifications and variations can be made in the invention. It is intended that the standard and examples be considered as exemplary only, with a true scope of the disclosed embodiments being indicated by the following claims and their equivalents.

What is claimed is:

1. A battery control circuit for balancing a battery, comprising:
   a controller, generating a control signal according to a voltage difference of the battery;
   a balancing device; and
   a switch, coupled between the battery and the balancing device, being opened or closed according to the control signal,
   wherein if the voltage difference is greater than a threshold value, the switch is closed and the balancing device draws a load current from the battery, and if the voltage difference is smaller than or equal to the threshold value, the switch is opened and the balancing device is not capable of drawing any current;
   wherein the controller comprises:
   a Zener diode, having a cathode and an anode coupled to a ground voltage; and
   an OR gate, having two input ends coupled to the cathode of the Zener diode and an output end coupled to the switch, wherein the output end is configured to output the control signal.

2. The battery control circuit as claimed in claim 1, further comprising a voltage detector detecting the voltage difference of the battery so as to generate a detecting signal, wherein the control signal is generated according to the detecting signal, wherein the voltage detector comprises:
an operational amplifier (OP), having a positive input end coupled to the battery, a negative input end coupled to the ground voltage, and an output end, wherein the output end is configured to output the detecting signal.

3. The battery control circuit as claimed in claim 1, wherein the balancing device is coupled to the ground voltage or a next-stage battery interconnected in series with the battery.

4. The battery control circuit as claimed in claim 1, wherein the switch comprises:
a first transistor, coupled between the battery and the balancing device, and having a gate;
a second transistor, coupled between the gate of the first transistor and the ground voltage, and having a gate coupled to the control signal; and
a resistor, coupled between the gate of the first transistor and the battery.

5. The battery control circuit as claimed in claim 4, wherein the first transistor is a PMOS transistor (P-channel Metal-Oxide-Semiconductor Field-Effect Transistor), and the second transistor is an NMOS transistor (N-channel Metal-Oxide-Semiconductor Field-Effect Transistor).

6. A battery control system, comprising:
a battery, having a voltage difference;
a controller, generating a control signal according to the voltage difference of the battery;
a balancing device; and
a switch, coupled between the battery and the balancing device, being opened or closed according to the control signal,
wherein if the voltage difference is greater than a threshold value, the switch is closed and the balancing device draws a load current from the battery, and if the voltage difference is smaller than or equal to the threshold value, the switch is opened and the balancing device is not capable of drawing any current;
wherein the controller comprises:
a Zener diode, having a cathode and an anode coupled to a ground voltage; and
an OR gate, having two input ends coupled to the cathode of the Zener diode and an output end coupled to the switch, wherein the output end is configured to output the control signal.

7. The battery control system as claimed in claim 6, further comprising a voltage detector detecting the voltage difference of the battery so as to generate a detecting signal, wherein the control signal is generated according to the detecting signal, wherein the voltage detector comprises:
an operational amplifier (OP), having a positive input end coupled to the battery, a negative input end coupled to the ground voltage, and an output end, wherein the output end is configured to output the detecting signal.

8. The battery control system as claimed in claim 6, wherein the balancing device is coupled to the ground voltage or a next-stage battery interconnected in series with the battery.

9. The battery control system as claimed in claim 6, wherein the switch comprises:
a first transistor, coupled between the battery;
a second transistor, coupled between the gate of the first transistor and the ground voltage, and having a gate coupled to the control signal; and
a resistor, coupled between the gate of the first transistor and the battery.

10. The battery control system as claimed in claim 6, further coupled to a processor configured to obtain the detecting signal.

11. A battery control method for balancing a battery, comprising the steps of:
generating a control signal according to a voltage difference of the battery;
drawing a load current from the battery by a balancing device if the voltage difference is greater than a threshold value; and
not drawing current from the battery by the balancing device if the voltage difference is smaller than or equal to the threshold value;
wherein the steps of drawing or not drawing a load current from the battery by a balancing device is performed by a switch and the balancing device, the control signal is generated by a controller, and wherein the controller comprises:
a Zener diode, having a cathode and an anode coupled to a ground voltage; and
an OR gate, having two input ends coupled to the cathode of the Zener diode and an output end coupled to the switch, wherein the output end is configured to output the control signal.

12. The battery control method as claimed in claim 11, wherein a voltage detector is used to detect the voltage difference of the battery so as to generate a detecting signal, wherein the control signal is generated according to the detecting signal, and wherein the voltage detector comprises:
an operational amplifier (OP), having a positive input end coupled to the battery, a negative input end coupled to the ground voltage, and an output end, wherein the output end is configured to output the detecting signal.

13. The battery control method as claimed in claim 11, wherein the balancing device is coupled to the ground voltage or a next-stage battery interconnected in series with the battery.

14. The battery control method as claimed in claim 11, wherein the switch comprises:
a first transistor, coupled between the battery and the balancing device, and having a gate;
a second transistor, coupled between the gate of the first transistor and the ground voltage, and having a gate coupled to the control signal; and
a resistor, coupled between the gate of the first transistor and the battery.

15. The battery control method as claimed in claim 14, wherein the first transistor is a PMOS transistor (P-channel Metal-Oxide-Semiconductor Field-Effect Transistor), and the second transistor is an NMOS transistor (N-channel Metal-Oxide-Semiconductor Field-Effect Transistor).

* * * * *